(12) United States Patent
Kimoto (10) Patent No.: US 8,037,342 B2
(45) Date of Patent: Oct. 11, 2011

(54) COMMUNICATION APPARATUS AND CONTROL METHOD

(75) Inventor: Tatsuya Kimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 12/484,930

(22) Filed: Jun. 15, 2009

(65) Prior Publication Data

US 2010/0017645 A1   Jan. 21, 2010

(30) Foreign Application Priority Data

Jul. 18, 2008 (JP) ................................. 2008-187296

(51) Int. Cl.
*G06F 11/00* (2006.01)
(52) U.S. Cl. ........................... 714/4.1; 714/4.11; 714/48
(58) Field of Classification Search ................. 714/4, 18, 714/4.1, 48
See application file for complete search history.

(56) References Cited

U.S. PATENT DOCUMENTS

2005/0027993 A1* 2/2005 Yanagisawa .................. 713/189
2009/0089842 A1* 4/2009 Perry et al. ...................... 725/78

FOREIGN PATENT DOCUMENTS

JP        2006-094430 A    4/2006

* cited by examiner

*Primary Examiner* — Scott Baderman
*Assistant Examiner* — Sarai Butler
(74) *Attorney, Agent, or Firm* — Canon U.S.A., Inc., IP Division (57) ABSTRACT

A communication apparatus includes: a transmitting unit, a receiving unit and a control unit. The transmitting unit transmits video data to an external apparatus via a first transmission line. The receiving unit receives a command from the external apparatus via a second transmission line. The control unit that resets the transmitting unit without resetting the receiving unit if a communication error relating to the first transmission line is detected, and resets the receiving unit without resetting the transmitting unit if a communication error relating to the second transmission line is detected.

18 Claims, 5 Drawing Sheets

COMMUNICATION APPARATUS AND CONTROL METHOD

BACKGROUND OF THE INVENTION

1. Field of the Invention

The present invention relates to a communication apparatus which transmits video data to an external apparatus, and control method thereof.

2. Description of the Related Art

As disclosed in Japanese Patent Laid-Open No. 2006-094430, there has been known a communication system which performs serial communication between a transmission apparatus and reception apparatus.

With the above mentioned communication system, in a case where the reception apparatus is detected that data communication between the transmission apparatus and reception apparatus is not performed normally, a communication error notice is transmitted to the transmission apparatus by the reception apparatus via a communication line.

Upon receiving the communication error notice, the transmission apparatus transmits initialization data for controlling the reception apparatus to the reception apparatus for a predetermined period of time to return the reception apparatus to a receivable state.

However, with the above mentioned communication system, there has been a problem wherein after the initialization data is transmitted for a predetermined period of time, the transmission apparatus stops transmitting all data for a while. Such an arrangement has caused a problem wherein transmission of video data is discontinued, and accordingly, display of the video at the reception apparatus is interrupted.

Also, with the above mentioned communication system, a transmission line for transmitting video data, and a transmission line for transmitting a control command are not separated, and accordingly, these transmission lines could not have been reset separately.

SUMMARY OF THE INVENTION

The present invention is directed to overcome the above mentioned drawbacks and disadvantages, and enables the communication apparatus to return to a normal state from a communication error state without interrupting transmission of video data.

According to an aspect of the present invention, there is provided a communication apparatus including: A communication apparatus, comprising: a transmitting unit that transmits video data to an external apparatus via a first transmission line; a receiving unit that receives a command from the external apparatus via a second transmission line; and a control unit that resets the transmitting unit without resetting the receiving unit if a communication error relating to the first transmission line is detected, and resets the receiving unit without resetting the transmitting unit if a communication error relating to the second transmission line is detected.

According to an aspect of the present invention, there is provided a method of controlling a communication apparatus including (a) a transmitting unit that transmits video data to an external apparatus via a first transmission line and (b) a receiving unit that receives a command from the external apparatus via a second transmission line, the method comprising the steps of: resetting the transmitting unit without resetting the receiving unit if a communication error relating to the first transmission line is detected; and resetting the receiving unit without resetting the transmitting unit if a communication error relating to the second transmission line is detected.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the principles of the present invention.

DESCRIPTION OF THE EMBODIMENTS

Various exemplary embodiments, features, and aspects of the present invention will now be described in detail below with reference to the attached drawings.

First Embodiment

Figure 1:
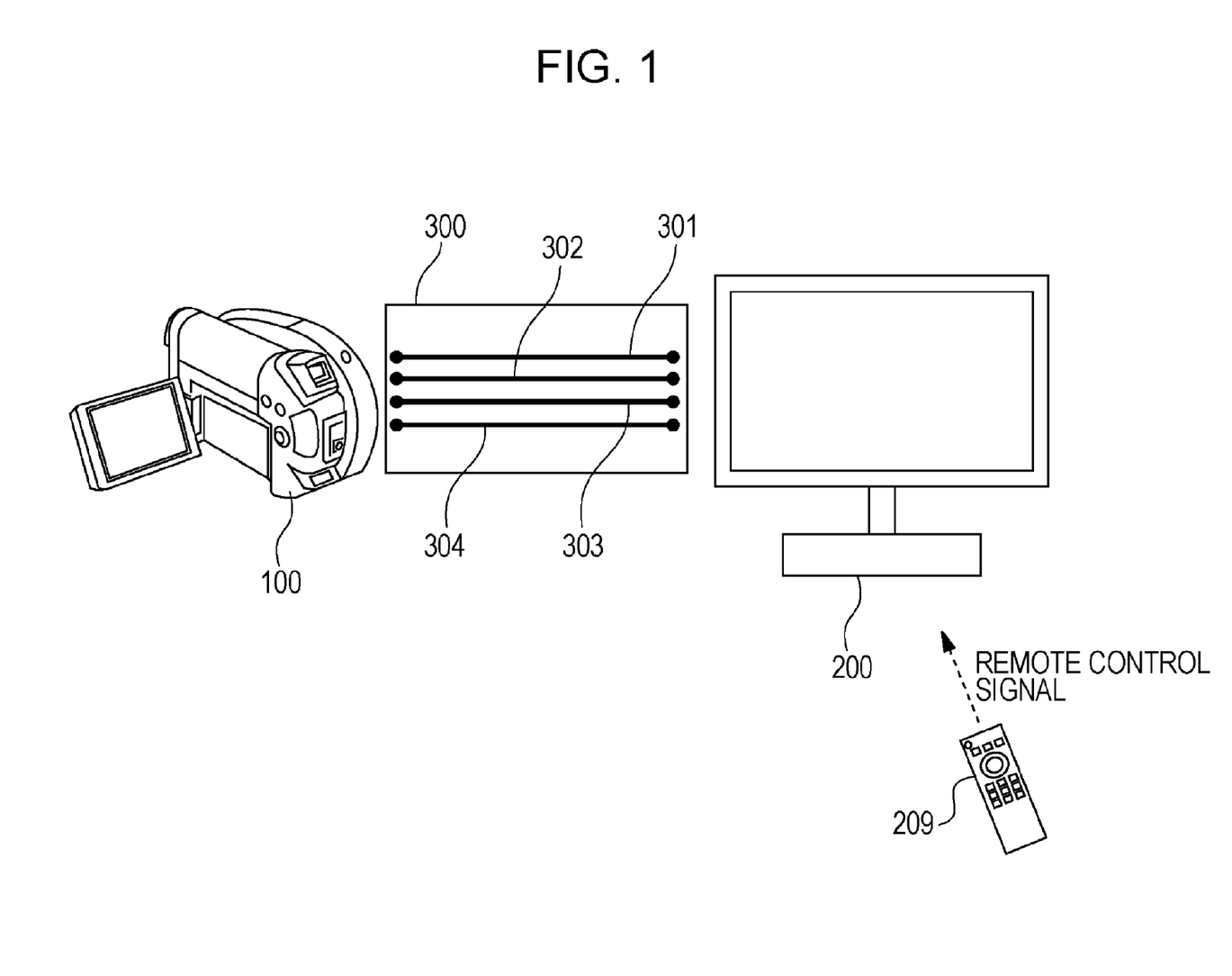
FIG. 1 is a diagram illustrating an example of communication systems according to first and second embodiments of the present invention.
Figure 2:
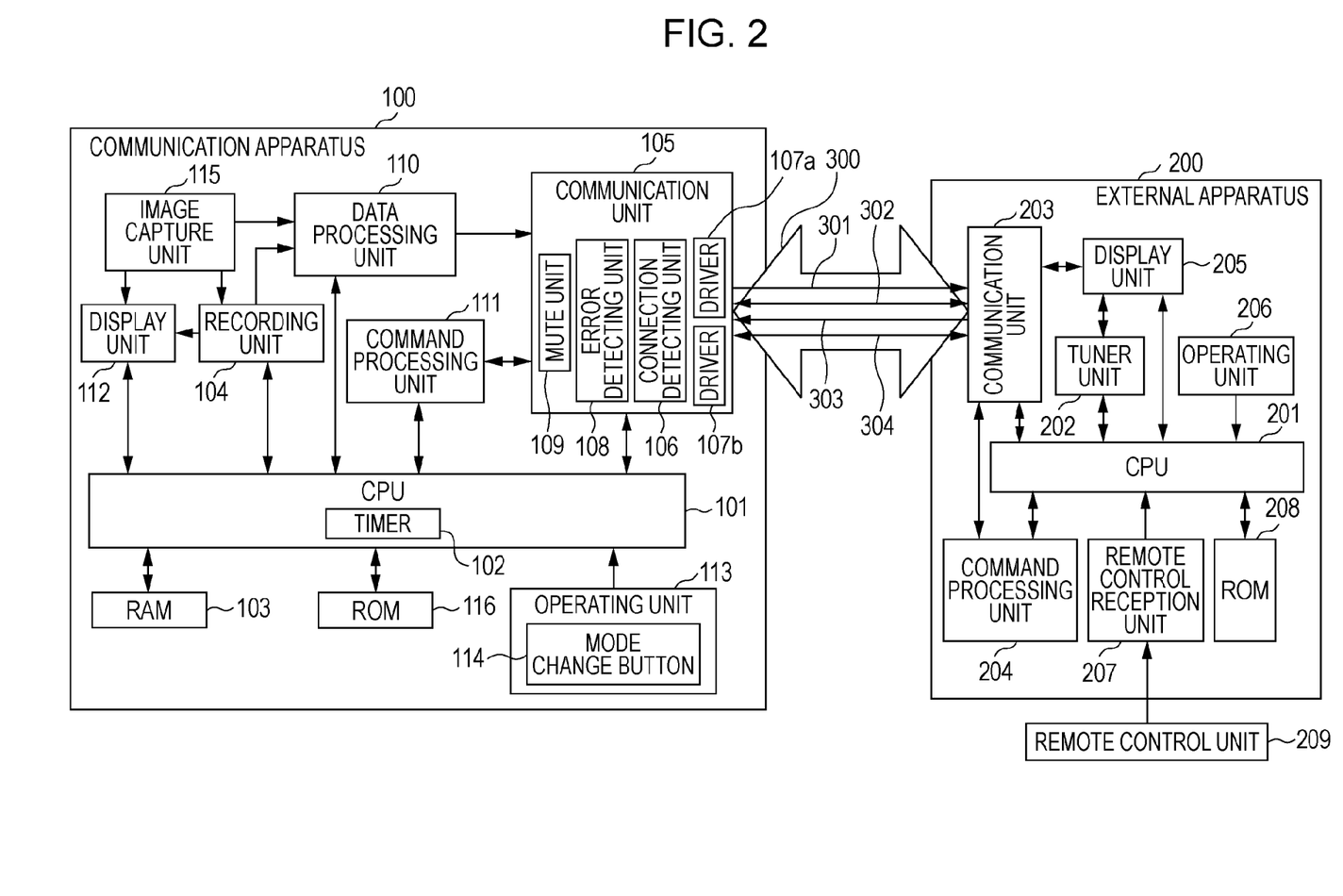
FIG. 2 is a block diagram illustrating an example of the schematic configurations of the communication systems according to the first and second embodiments of the present invention.

FIG. 1 is a diagram illustrating an example of a communication system according to the first embodiment of the present invention. FIG. 2 is a block diagram illustrating an example of the schematic configuration of the communication system according to the first embodiment of the present invention.

The communication system according to the first embodiment includes, as shown in FIGS. 1 and 2, a communication apparatus 100, connection cable 300, external apparatus 200, and remote control unit 209. The communication apparatus 100 and external apparatus 200 are connected via the connection cable 300. The external apparatus 200 and remote control unit 209 are connected wirelessly.

The communication apparatus 100 is a video source capable of transmitting video data, audio data, and auxiliary data to the external apparatus 200 via the connection cable 300. The external apparatus 200 is an external display apparatus which displays the video data transmitted from the communication apparatus 100 on a display, and outputs the audio data transmitted from the communication apparatus 100 from speakers. The communication apparatus 100 and external apparatus 200 can transmit various control commands bidirectionally via the connection cable 300.

The remote control unit 209 is a user interface for operating the communication apparatus 100 and external apparatus 200. The remote control unit 209 is configured to communicate with the external apparatus 200 wirelessly, but not to communicate with the communication apparatus 100 wirelessly. The external apparatus 200 receives the remote control signal transmitted from the remote control unit 209, and analyzes the received remote control signal. In a case where the received remote control signal is a remote control signal for controlling the external apparatus 200, the external apparatus 200 controls the external apparatus 200 in accordance with the received remote control signal. In a case where the received remote control signal is a remote control signal for controlling the communication apparatus 100, the external apparatus 200 generates the control command corresponding to the received remote control signal, and transmits the generated control command to the communication apparatus 100 via the connection cable 300. Thus, the user can perform remote control of the external apparatus 200 directly by using the remote control unit 209. Also, the user can perform remote control of the communication apparatus 100 indirectly by using the remote control unit 209.

With the first embodiment, a video camera is used as an example of the communication apparatus 100, and a television receiver (hereafter, referred to as "television") is used as an example of the external apparatus 200. Also, with the first embodiment, a connection cable conforming to the HDMI (High Definition Multimedia Interface) (registered trademark) standard is employed as an example of the connection cable 300. Hereafter, the connection cable conforming to the HDMI standard will be referred to as "HDMI cable".

Next, the HDMI cable 300 will be described. The HDMI cable 300 includes a TMDS (Transition Minimized Differential Signaling) (registered trademark) line 301, and CEC (Consumer Electronics Control) line 302. Also, the HDMI cable 300 includes an HPD (Hot Plug Detect) line 303, DDC (Display Data Channel) line 304, and power line.

The TMDS line 301 (first transmission line) is a transmission line for transmitting video data, audio data, and auxiliary data to the television 200 from the video camera 100. The TMDS line 301 includes a TMDS channel 0, TMDS channel 1, TMDS channel 2, and TMDS clock channel. The CEC line 302 (second transmission line) is a transmission line for transmitting various control commands between the video camera 100 and television 200 bidirectionally. The HPD line 303 is a transmission line for transmitting HPD signal to the video camera 100 from the television 200. The DDC line 304 is a transmission line for transmitting EDID (Extended Display Identification Data) of the television 200 to the video camera 100 from the television 200. The EDID includes capability information indicating the display capability and so forth of the television 200. The power line is a line for supplying power to the television 200 from the video camera 100.

The video camera 100 operates as a HDMI source stipulated with the HDMI standard, and the television 200 operates as a HDMI sink stipulated with the HDMI standard. Also, the video camera 100 and television 200 are both HDMI apparatuses conforming to the CEC. The CEC is a control protocol stipulated with the HDMI standard. Hereafter, a control command to be transmitted between the video camera 100 and television 200 via the CEC line 302 will be referred to as "CEC command". The television 200 can control the video camera 100 by transmitting a CEC command for controlling the video camera 100 to the video camera 100 via the CEC line 302. The video camera 100 can also control the television 200 by transmitting a CEC command for controlling the television 200 to the television 200 via the CEC line 302. CEC commands for controlling the video camera 100 include a power on command, power off command, and commands relating to the power of the video camera 100. Also, as commands for controlling the video camera 100, there are a playback command, stop command, pause command, fast forward command, rewind command, recording command, recording pause command, menu on command, and menu off command.

Note that the connection cable 300 is not restricted to an HDMI cable. If a connection cable other than an HDMI cable separately includes a transmission line for transmitting video data, audio data and auxiliary data, and a transmission line for transmitting various control commands bidirectionally between the communication apparatus 100 and external apparatus 200, the connection cable may be used.

Next, an example of the configuration of the video camera 100 will be described. The video camera 100 includes, as shown in FIG. 2, a CPU 101, RAM 103, recording unit 104, communication unit 105, data processing unit 110, command processing unit 111, display unit 112, operating unit 113, image capture unit 115, and ROM 116.

The video camera 100 has an operation mode such as image capture mode, playback mode, or the like. In a case where the operation mode of the video camera 100 is the image capture mode, the video camera 100 can execute capturing of an object, and can record an image-captured video (any one of a moving image and still image) in a recording medium. In a case where the operation mode of the video camera 100 is the playback mode, the video camera 100 can reproduce the video (any one of a moving image and still image) selected by the user from the recording medium.

The CPU (Central Processing Unit) 101 controls the operation of the video camera 100 in accordance with a computer program stored in the ROM 116. Also, the CPU 101 includes a timer 102 for counting a constant value N. Let us say that the constant value N is, for example, a value equivalent to three through ten seconds. Note that the constant value N may be a value that the user can change arbitrarily.

The RAM 103 is memory serving as a work area of the CPU 101, and is memory for storing various values, data, and information used at the CPU 101. The CPU 101 obtains information relating to the television 200 from the television 200 via the HDMI cable 300, and stores the obtained information in the RAM 103. The information to be stored in the RAM 103 includes GUID which is peculiar information of the television 200, the EDID of the television 200, and so forth. Note that the work area of the CPU 101 is not restricted to the RAM 103, and may be an external storage apparatus such as a hard disk apparatus or the like.

In a case where the operation mode of the video camera 100 is the image capture mode, the image capture unit 115 image-captures an object to generate video data from the optical image of the object thereof. The video data generated in the image capture unit 115 is supplied to the recording unit 104, display unit 112, and data processing unit 110. Audio data generated in a microphone (not shown) unit is also supplied to the recording unit 104 and data processing unit 110.

In a case where the operation mode of the video camera 100 is the image capture mode, the recording unit 104 can record the video data that the image capture unit 115 generated, and the audio data that the microphone (not shown) unit generated in the recording medium.

Also, in a case where the operation mode of the video camera 100 is the playback mode, the recording unit 104 can reproduce the video data and audio data selected by the user from the recording medium. The video data reproduced from the recording medium is supplied to the display unit 112 and data processing unit 110. On the other hand, the audio data reproduced from the recording medium is supplied to the data processing unit 110 and a speaker unit (not shown). Note that the recording medium used by the recording unit 104 may be a recording medium which has been built into the video camera 100, or may be a recording medium detachable from the video camera 100.

The communication unit 105 includes an HDMI terminal for connecting the HDMI cable 300. In a case where the video camera 100 is the image capture mode, the communication unit 105 transmits the video data generated in the image capture unit 115, the audio data generated in the microphone unit (not shown), and the auxiliary data generated in the CPU 101 to the television 200 via the TMDS line 301. In a case where the operation mode of the video camera 100 is the playback mode, the communication unit 105 transmits the video data and audio data that the recording unit 104 reproduced from the recording medium, and the auxiliary data generated in the CPU 101 to the television 200 via the TMDS line 301.

Also, the communication unit 105 includes a connection detecting unit 106, TMDS driver 107a, CEC driver 107b, error detecting unit 108, and mute unit 109.

The connection detecting unit 106 uses the HPD signal transmitted to the video camera 100 from the television 200 to detect connection between the video camera 100 and television 200 (hereafter, HDMI connection). The connection detecting unit 106 receives the HPD signal from the television 200 via the HPD line 303. In a case where the HPD signal is high, the connection detecting unit 106 detects HDMI connection between the video camera 100 and television 200. In a case where the HPD signal is low, the connection detecting unit 106 detects disconnection of the HDMI connection between the video camera 100 and television 200. In a case where the HPD signal cannot be detected, the connection detecting unit 106 also detects disconnection of the HDMI connection between the video camera 100 and television 200. The detection result of the connection detecting unit 106 is informed to the CPU 101, and accordingly, the CPU 101 can determine whether the HDMI connection between the video camera 100 and television 200 has been disconnected.

The TMDS driver 107a is a controller for controlling the TMDS line 301. The TMDS driver 107a is in a low power consumption state when the video camera 100 and television 200 are not connected with the HDMI cable 300. In the case of receiving a TMDS enable signal from the CPU 101, the TMDS driver 107a changes to a normal state from a low power consumption state. In this case, the TMDS driver 107a enables the TMDS line 301. In a case where the TMDS line 301 has been enabled, the communication unit 105 can transmit video data, audio data, and auxiliary data to the television 200 via the TMDS line 301.

In the case of receiving a TMDS disable signal from the CPU 101, the TMDS driver 107a changes to a low power consumption state from a normal state. In this case, the TMDS driver 107a disables the TMDS line 301. In a case where the TMDS line 301 has been disabled, the communication unit 105 cannot transmit video data, audio data, and auxiliary data to the television 200 via the TMDS line 301, but the consumption power of the communication unit 105 is reduced.

The CEC driver 107b is a controller for controlling the CEC line 302. The CEC driver 107b is in a low power consumption state when the video camera 100 and television 200 are not connected with the HDMI cable 300. In the case of receiving a CEC enable signal from the CPU 101, the CEC driver 107b changes to a normal state from a low power consumption state. In this case, the CEC driver 107b enables the CEC line 302. In a case where the CEC line 302 has been enabled, the communication unit 105 can receive a CEC command for controlling the video camera 100 from the television 200, and can also transmit a CEC command for controlling the television 200 to the television 200.

In the case of receiving a CEC disable signal from the CPU 101, the CEC driver 107b changes to a low power consumption state from a normal state. In this case, the CEC driver 107b disables the CEC line 302. In a case where the CEC line 302 has been disabled, the communication unit 105 cannot receive a CEC command for controlling the video camera 100 from the television 200, and also cannot transmit a CEC command for controlling the television 200 to the television 200.

The error detecting unit 108 detects a communication error relating to the TMDS line 301 and a communication error relating to the CEC line 302 to inform the detection results to the CPU 101.

The mute unit 109 generates data for changing the television 200 to a mute state (hereafter, referred to as mute instruction), and executes a mute process for transmitting the generated mute instruction to the television 200 via the TMDS line 301. The mute instruction is one of the auxiliary data to be transmitted via the TMDS line 301. In a case where execution of the mute process is started, the CPU 101 controls the mute unit 109 to transmit the mute instruction to the television 200 continuously until execution of the mute process is canceled. In this case, the CPU 101 controls the data processing unit 110 and communication unit 105 to transmit the mute image and silent data stored in the ROM 116 to the television 200 continuously until execution of the mute process is canceled. Note that the mute image and silent data stored in the ROM 116 are transmitted to the television 200 via the TMDS line 301.

Also, the communication unit 105 can receive the CEC command from the television 200 via the CEC line 302. In the case of receiving the CEC command from the television 200, the communication unit 105 supplies the received CEC command to the CPU 101 via the command processing unit 111. Also, the communication unit 105 can also transmit a CEC command for controlling the television 200 to the television 200 via the CEC line 302. A CEC command for controlling the television 200 is generated in the CPU 101, and is supplied to the communication unit 105 via the command processing unit 111.

In a case where the operation mode of the video camera 100 is the image capture mode, the data processing unit 110 supplies the video data generated in the image capture unit 115, the audio data generated in the microphone unit (not shown), and the auxiliary data supplied from the CPU 101 to the communication unit 105. In a case where the operation mode of the video camera 100 is the playback mode, the data processing unit 110 supplies the video data and audio data that the recording unit 104 reproduced from the recording medium, and the auxiliary data supplied from the CPU 101 to the communication unit 105.

The display unit 112 is configured of a liquid crystal display or the like. In a case where the operation mode of the video camera 100 is the image capture mode, the display unit 112 displays the video data that the image capture unit 115 generated. In a case where the operation mode of the video camera 100 is the playback mode, the display unit 112 displays the video data that the recording unit 104 reproduced from the recording medium.

Also, in the case of a mute state, the display unit 112 displays the mute image stored in the ROM 116. With the first embodiment, the mute image is video data indicating that the mute process is being executed. The mute image is made up of, for example, a black back image (an video of which the background color is black) or blue back image (an video of which the background color is blue). An icon and character information indicating that the mute process is being executed may be included in the mute image. Note that, with the first embodiment, an arrangement has been made wherein, in a case where the display unit 112 is in a mute state, the mute image stored in the ROM 116 is displayed on the display unit 112, but the display on the display unit 112 is not restricted to this. In a case where the display unit 112 is in a mute state, nothing may be displayed on the display unit 112.

The operating unit 113 is a user interface for operating the video camera 100, and includes multiple buttons for operating the video camera 100. The instruction from the user is input to the CPU 101 via the operating unit 113. Each button within the operating unit 113 is configured of a switch, touch panel, or the like. The operating unit 113 includes a power button, start/stop button, mode change button 114, menu button, + button, − button, SET button, and so forth. Note that the + button and − button may be replaced with a cross key.

The power button is a button for instructing the CPU 101 to change the video camera 100 to a power on state or power off state. The power on state is a state in which necessary power can be supplied to the whole of the video camera 100 from a power source (battery, AC power source, or the like) (not shown). The power off state is a state in which supply of power to a portion or the whole of the video camera 100 from the power source (battery, AC power source, or the like) (not shown) is stopped.

The start/stop button is a button for instructing the CPU 101 to start or temporarily stop recording of the video data or the like generated in the image capture unit 115 to the recording medium. The mode change button 114 is a button for instructing the CPU 101 to change the operation mode of the video camera 100 to one of the image capture mode, playback mode, and so forth.

The menu button is a button for instructing the CPU 101 to display/hide a menu screen of the video camera 100. The menu screens of the video camera 100 includes a menu screen for controlling the video camera 100, and a menu screen for changing the settings of the video camera 100. These menu screens are stored in the ROM 116.

In the case of displaying a menu screen, the CPU 101 reads out the menu screen to be displayed from the ROM 116, and supplies the read menu screen to the display unit 112 and data processing unit 110. At this time, the CPU 101 superposes a cursor or the like on the menu screen. The display unit 112 and data processing unit 110 superpose the menu screen supplied from the CPU 101 on the video data supplied from the image capture unit 115 or recording unit 104. Thus, the same menu screen is displayed on the display unit 112 and television 200. In the case of hiding the menu screen, the CPU 101 stops supply of the menu screen to the display unit 112 and data processing unit 110.

The + button and − button are buttons for moving the cursor on the menu screen. The SET button is a button for instructing the CPU 101 to execute the item selected by the cursor. Movement between menu screens can be executed by employing the + button, − button, and SET button.

Also, the operating unit 113 includes a playback button, stop button, pause button, fast forward button, rewind button, and so forth. These buttons are buttons for instructing the CPU 101 to execute execution of playback, stop, pause, fast forward, and rewind of the video data recorded in the recording medium.

As described above, the mute image, menu screens, and so forth are stored in the ROM 116. Multiple icons for informing the user of the state of the video camera 100 are also stored in the ROM 116. Also, a computer program for controlling the operation of the video camera 100 is also stored in the ROM 116.

Note that the communication apparatus 100 is not restricted to a video camera. For example, the communication apparatus 100 may be an image capture apparatus such as a video camera, still camera, cell phone with camera, or the like.

Next, an example of the configuration of the television 200 will be described. The television 200 includes, as shown in FIG. 2, a CPU 201, tuner unit 202, communication unit 203, command processing unit 204, display unit 205, operating unit 206, remote control reception unit 207, and ROM 208.

The CPU (Central Processing Unit) 201 controls the operation of the television 200 in accordance with a computer program stored in the ROM 208.

The tuner unit 202 receives analog television broadcasting, digital television broadcasting, or cable television broadcasting in accordance with the selection by the user. The type of the television broadcasting that the tuner unit 202 receives can be selected from a remote control unit 209. The television channel that the tuner unit 202 receives can also be selected from the remote control unit 209. The video data included in the analog television broadcasting, digital television broadcasting, or cable television broadcasting is displayed on the display unit 205. Also, the audio data included in the analog television broadcasting, digital television broadcasting, or cable television broadcasting is output from a speaker (not shown) unit.

The communication unit 203 includes an HDMI terminal for connecting the HDMI cable 300. The communication unit 203 can receive the video data, audio data, and auxiliary data transmitted from the video camera 100 via the TMDS line 301. The video data transmitted from the video camera 100 is displayed on the display unit 205. The audio data transmitted from the video camera 100 is output from the speaker unit (not shown). Also, the auxiliary data transmitted from the video camera 100 is supplied to the CPU 201.

Also, the communication unit 203 can receive the CEC command from the video camera 100 via the CEC line 302. In the case of receiving the CEC command from the video camera 100, the communication unit 203 supplies the received CEC command to the CPU 201 via the command processing unit 204. Also, the communication unit 203 can also transmit a CEC command for controlling the video camera 100 to the video camera 100 via the CEC line 302. A CEC command for controlling the video camera 100 is generated in the CPU 201, and is supplied to the communication unit 203 via the command processing unit 204.

The communication unit 203 receives the CEC command from the video camera 100 via the CEC line 302. The CEC command from the video camera 100 is supplied from the communication unit 203 to the CPU 201 via the command processing unit 204.

A CEC command for controlling the video camera 100 is generated in the CPU 201, and is supplied to the communication unit 203 via the command processing unit 204. A CEC command for controlling the video camera 100 is supplied from the command processing unit 204 to the communication unit 203, and is transmitted to the video camera 100 via the CEC line 302.

The display unit 205 is configured of a display such as a liquid crystal display or the like. The display unit 205 can display the video data supplied from at least one of the tuner unit 202 and communication unit 203. The display unit 205 can also display the mute image stored in the ROM 208.

The operating unit 206 is a user interface for operating the television 200. Also, the operating unit 206 includes, similar to the remote control unit 209, multiple buttons for operating the television 200. Each button within the operating unit 206 is configured of a switch, touch panel, or the like.

In the case of receiving the remote control signal transmitted from the remote control unit 209, the remote control reception unit 207 supplies the received remote control signal to the CPU 201. Thus, the instruction from the user is input to the CPU 201 via the remote control unit 209 and remote control reception unit 207. The CPU 201 generates the CEC command corresponding to the remote control signal from the remote control reception unit 207, and supplies the generated CEC command to the communication unit 203 via the command processing unit 204. The CEC command supplied to the communication unit 203 is transmitted to the video camera 100 via the CEC line 302. Thus, the user can control the video camera 100 remotely by using the remote control unit 209.

As described above, the mute image, menu screens, and so forth are stored in the ROM 208. The multiple icons for informing the user of the state of the television 200, the EDID of the television 200, and so forth are also stored in the ROM 208. Also, the computer program for controlling the operation of the television 200 is also stored in the ROM 208.

The remote control unit 209 is a user interface for operating the video camera 100 and television 200, and includes multiple buttons for operating the video camera 100, and multiple buttons for operating the television 200. Each button within the remote control unit 209 is configured of a switch, touch panel, or the like. The remote control unit 209 includes a first power button, television broadcasting selection button, channel button, external input button, menu button, + button, − button, SET button, and so forth. These buttons are buttons for operating the television 200.

The first power button is a button for instructing the CPU 201 to change the television 200 to a power on state or power off state. The power on state is a state in which necessary power can be supplied to the whole of the television 200 from a power source (not shown). The power off state is a state in which supply of power to a portion or the whole of the television 200 from the power source (not shown) is stopped.

The television broadcasting selection button is a button for instructing the CPU 201 to select one of analog television broadcasting, digital television broadcasting, and cable television broadcasting, and to have the tuner unit 202 receive the selected television broadcasting. The channel button is a button for selecting a television channel that the tuner unit 202 receives.

The external input button is a button for selecting one of the video data received by the tuner unit 202, and the video data transmitted from the video camera 100, and displaying the selected video data on the display unit 205.

The menu button is a button for instructing the CPU 201 to display or hide the menu screen of the television 200. The menu screens of the television 200 includes a menu screen for controlling the television 200, and a menu screen for changing the settings of the television 200. These menu screens are stored in the ROM 208.

In the case of displaying a menu screen, the CPU 201 reads out the menu screen to be displayed from the ROM 208, and supplies the read menu screen to the display unit 205. At this time, the CPU 201 superposes the cursor or the like on the menu screen. The display unit 205 superposes the menu screen supplied from the CPU 201 on the video data supplied from the tuner unit 202 or communication unit 203. Thus, the menu screen of the television 200 is displayed on the display unit 205. In the case of hiding the menu screen, the CPU 201 stops supply of the menu screen to the display unit 205.

The + button and − button are buttons for moving the cursor on the menu screen. The SET button is a button for instructing the CPU 201 to execute the item selected by the cursor. Movement between menu screens can be executed by using the + button, − button, and SET button.

Note that, in a case where the menu screen of the video camera 100 is displayed on the television 200, the + button, − button, and SET button can also operate the cursor on the menu screen thereof. In this case, the CEC commands corresponding to the operation as to the + button, − button, and SET button are transmitted from the television 200 to the video camera 100 via the CEC line 302.

Also, the remote control unit 209 includes a second power button, playback button, stop button, pause button, fast forward button, rewind button, start/stop button, menu button, and so forth. These buttons are buttons for operating the video camera 100.

The second power button is a button for instructing the CPU 201 to transmit a power on command or power off command to the video camera 100 via the CEC line 302. The power ON command is a CEC command for instructing the CPU 101 to change the video camera 100 to a power ON state. The power off command is a CEC command for instructing the CPU 101 to change the video camera 100 to a power off state.

The playback button, stop button, and pause button are buttons for instructing the CPU 201 to transmit a playback command, stop command, and pause command to the video camera 100 via the CEC line 302, respectively. Also, the fast forward button, and rewind button are buttons for instructing the CPU 201 to transmit a fast forward command, and rewind command to the video camera 100 via the CEC line 302, respectively. These commands are CEC commands for instructing the CPU 101 to execute execution of playback, stop, pause, fast forward, and rewind of the video data recorded in the recording medium.

The start/stop button is a button for instructing the CPU 201 to transmit a recording command or recording pause command to the video camera 100 via the CEC line 302. The recording command is a CEC command for instructing the CPU 101 to start recording of the video data and so forth generated in the image capture unit 114 as to the recoding medium. The recording pause command is a CEC command for instructing the CPU 101 to pause recording of the video data generated in the image capture unit 114 as to the recording medium.

The menu button is a button for instructing the CPU 201 to transmit a menu on command or menu off command to the video camera 100 via the CEC line 302.

The menu on command is a CEC command for instructing the CPU 101 to display of the menu screen of the video camera 100. In the case of displaying a menu screen, the CPU 101 reads out the menu screen to be displayed from the ROM 116, and supplies the read menu screen to the display unit 112 and data processing unit 110. At this time, the CPU 101 superposes the cursor or the like on the menu screen. The display unit 112 and data processing unit 110 superpose the menu screen supplied from the CPU 101 on the video data supplied from the image capture unit 115 or recording unit 104. Thus, the same menu screen is displayed on the display unit 112 and television 200.

The menu off command is a CEC command for instructing the CPU 101 to hide the menu screen of the video camera 100. In the case of hiding the menu screen, the CPU 101 stops supply of the menu screen to the display unit 112 and data processing unit 110. Thus, the television 200 can stop display of the menu screen of the video camera 100.

Note that the external apparatus 200 is not restricted to a television receiver. For example, the external apparatus 200 may be a personal computer having a display.

Next, the process executed in the video camera 100 according to the first embodiment will be described with reference to FIGS. 1 through 5.

Figure 3:
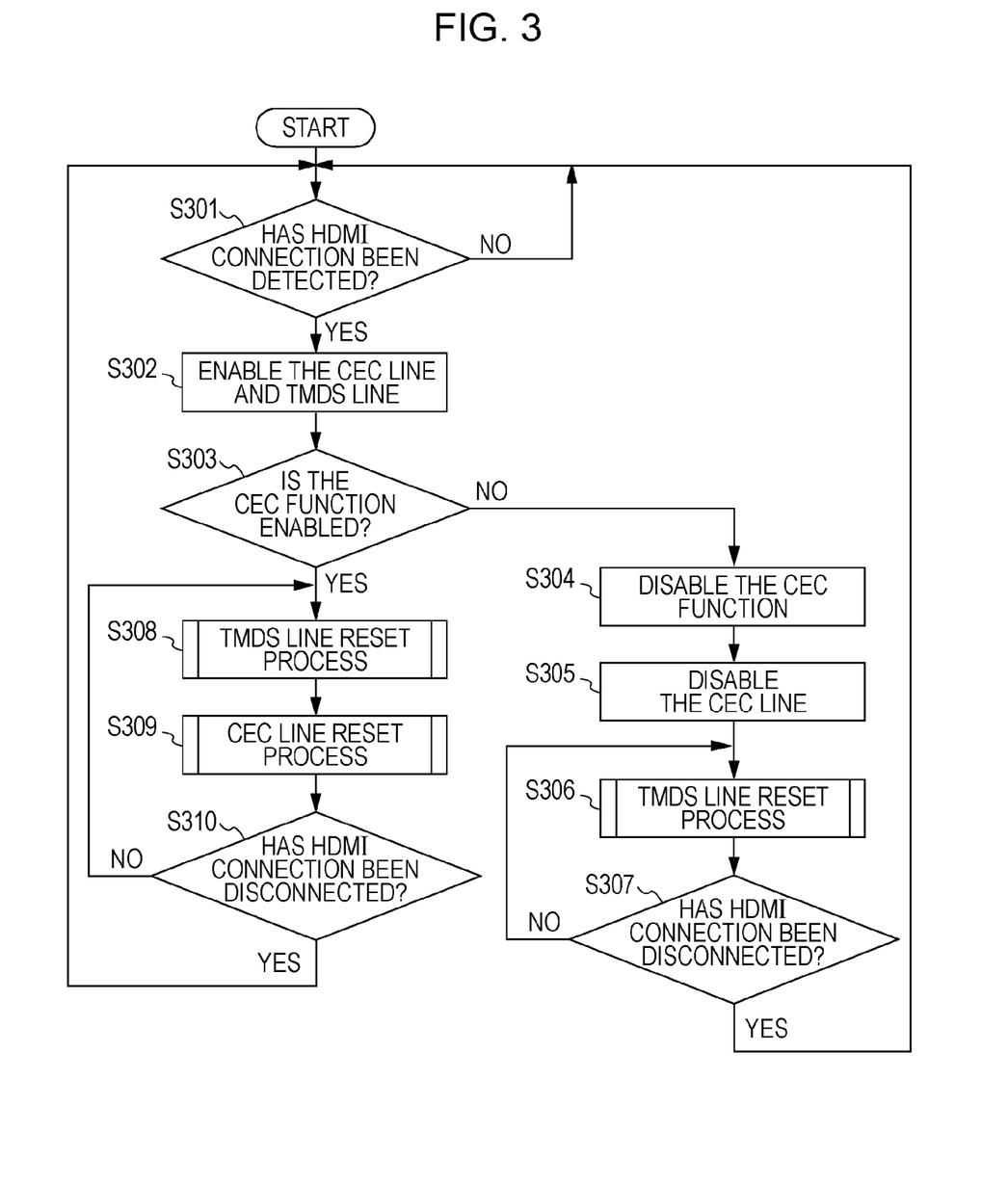
FIG. 3 is a flowchart illustrating an example of a process executed in a communication apparatus according to the first and second embodiments of the present invention.

FIG. 3 is a flowchart illustrating an example of a process executed in the video camera 100 according to the first embodiment. The process shown in the flowchart in FIG. 3 is a process that is executed when the video camera 100 is in a power on state. Note that the process shown in the flowchart in FIG. 3 is controlled by the CPU 101 executing the computer program stored in the ROM 116.

In step S301, the CPU 101 determines whether the HDMI connection between the video camera 100 and television 200 has been detected. The HDMI connection between the video camera 100 and television 200 is detected by the connection detecting unit 106. The detection result of the connection detecting unit 106 is informed to the CPU 101, whereby the CPU 101 can detect the HDMI connection between the video camera 100 and television 200.

If the HDMI connection has been detected (YES in step S301), the process proceeds to step S302 from step S301. If the HDMI connection has not been detected (NO in step S301), the process returns to step S301.

In step S302, the CPU 101 supplies the TMDS enable signal to the TMDS driver 107a, and supplies the CEC enable signal to the CEC driver 107b. Also, the CPU 101 obtains the EDID of the television 200 via the DDC line 304, and stores the obtained EDID in the RAM 103. Further, the CPU 101 enables the CEC function of the video camera 100.

The TMDS driver 107a which has received the TMDS enable signal from the CPU 101 changes to a normal state from a low power consumption state, and enables the TMDS line 301. In the case of the TMDS line 301 being enabled, the communication unit 105 can transmit video data, audio data, and auxiliary data to the television 200 via the TMDS line 301. In a case where the operation mode of the video camera 100 is the image capture mode, the video data generated from a captured video and the audio data thereof are transmitted from the video camera 100 to the television 200 via the TMDS line 301. In a case where the operation mode of the video camera 100 is the playback mode, the menu screen for selecting video data to be reproduced is transmitted to the television 200 from the video camera 100 via the TMDS line 301. Upon the user using the remote control unit 209 to instruct the television 200 to execute selection and reproducing of video data, the television 200 transmits the CEC command corresponding to the instruction thereof to the video camera 100. The video camera 100 reproduces the video data selected by the user, and the audio data thereof from the recording medium. The video data reproduced from the recording medium, and the audio data thereof are transmitted from the video camera 100 to the television 200 via the TMDS line 301.

The CEC driver 107b which has received the CEC enable signal changes from a normal state to a low power consumption state, and enables the CEC line 302. In a case where the CEC line 302 is enabled, the communication unit 105 can receive a CEC command for controlling the video camera 100 from the television 200, and can also transmit a CEC command for controlling the television 200 to the television 200.

In step S303, the CPU 101 determines whether the CEC function of the television 200 is enabled. In a case where the logical address of the television 200 could have been obtained from the television 200 via the CEC line 302, the CPU 101 determines that the CEC function of the television 200 is enabled. In a case where the logical address of the television 200 could not have been obtained from the television 200 via the CEC line 302, the CPU 101 determines that the CEC function of the television 200 is not enabled.

If the CEC function of the television 200 is not enabled (NO in step S303), the process proceeds to step S304 from step S303. If the CEC function of the television 200 is enabled (YES in step S303), the process proceeds to step S308 from step S303.

In step S304, the CPU 101 disables the CEC function of the video camera 100.

In step S305, the CPU 101 supplies a CEC disable signal to the CEC driver 107b. The CEC driver 107b which has received the CEC disable signal from the CPU 101 changes from a normal state to a low power consumption state, and disables the CEC line 302. At this time, the CPU 101 has not supplied the TMDS disable signal to the TMDS driver 107a, and accordingly, the TMDS line 301 has been kept in an enabled state.

In step S306, the CPU 101 starts a TMDS line reset process. The TMDS line reset process will be described later with reference to FIG. 4.

In step S307, the CPU 101 determines whether the HDMI connection between the video camera 100 and television 200 has been disconnected. Regarding whether the HDMI connection between the video camera 100 and television 200 has been disconnected is detected by the connection detecting unit 106. The detection result of the connection detecting unit 106 is informed to the CPU 101, whereby the CPU 101 can determine whether or not the HDMI connection between the video camera 100 and television 200 has been disconnected.

In a case where the HDMI cable is disconnected from the video camera 100, the HPD signal cannot be detected, whereby the connection detecting unit 106 can detect disconnection of the HDMI connection between the video camera 100 and television 200. Also, in a case where the television 200 changes to a power off state, the HPD signal changes from high to low, whereby the connection detecting unit 106 can detect disconnection of the HDMI connection between the video camera 100 and television 200. Note that the operation for changing the television 200 to a power off state may be based on the remote control unit 209, or may be based on the operating unit 206.

If the HDMI connection has been disconnected (YES in S307), the present process returns to step S301 from step S307. If the HDMI connection has not been disconnected (NO in S307), the process returns to step S306 from step S307.

In step S308, the CPU 101 starts the TMDS line reset process. The TMDS line reset process will be described later with reference to FIG. 4.

In step S309, the CPU 101 starts CEC line reset process. The CEC line reset process will be described later with reference to FIG. 5.

In step S310, the CPU 101 determines, in the same way as in step S307, whether the HDMI connection between the video camera 100 and television 200 has been disconnected.

If the HDMI connection has been disconnected (YES in S310), the process returns to step S301 from step S310. If the HDMI connection has not been disconnected (NO in S310), the process returns to step S308 from step S310.

Figure 4:
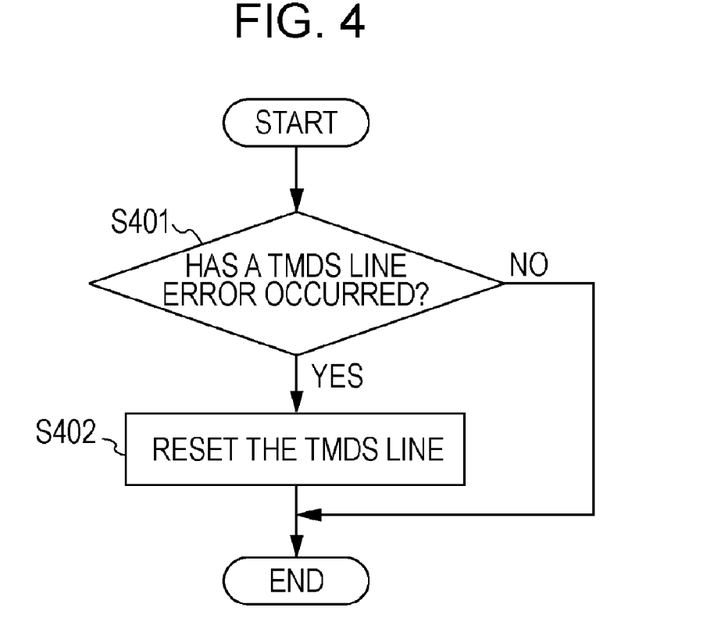
FIG. 4 is a flowchart illustrating an example of a TMDS line reset process executed in the communication apparatus according to the first embodiment of the present invention.

Next, an example of the TMDS line reset process executed in steps S306 and S308 in FIG. 3 will be described with reference to FIG. 4. Note that the process illustrated in the flowchart in FIG. 4 is controlled by the CPU 101 executing the computer program stored in the ROM 116.

In step S401, the CPU 101 determines whether the communication error relating to the TMDS line 301 has occurred. Occurrence of the communication error relating to the TMDS line 301 is detected by the error detecting unit 108. For example, in a case where one of overflow and underflow has occurred on a transmission buffer for the TMDS line 301, the error detecting unit 108 detects the occurrence of the communication error relating to the TMDS line 301. Also, in the case of receiving a signal indicating that the television 200 has detected a transmission error such as video data or the like, the error detecting unit 108 also detects the occurrence of the communication error relating to the TMDS line 301. In a case where one of overflow and underflow has occurred on a reception buffer for the TMDS line 301, the error detecting unit 108 also detects the occurrence of the communication error relating to the TMDS line 301. The detection result of the error detecting unit 108 is informed to the CPU 101, whereby the CPU 101 can determine whether the communication error relating to the TMDS line 301 has occurred.

If the communication error relating to the TMDS line 301 has occurred (YES in S401), the process proceeds to step S402 from step S401. If the communication error relating to the TMDS line 301 has not occurred (NO in S401), the process ends, and consequently, the process returns to step S307 or step S309 in FIG. 3.

In step S402, the CPU 101 supplies a TMDS reset signal to the TMDS driver 107a. The TMDS driver 107a which has received the TMDS reset signal from the CPU 101 resets the TMDS line 301 to return the TMDS line 301 to a normal state. At this time, the TMDS line 301 is reset by the TMDS driver 107a, but the CEC line 302 is not reset by the CEC driver 107b. Accordingly, while the TMDS line 301 is reset, the CEC line 302 maintains an enabled state. Thus, the video camera 100 can return the TMDS line 301 to a normal state from a communication error relating to the CEC line 302 state without interrupting transmission or reception of a CEC command.

Figure 5:
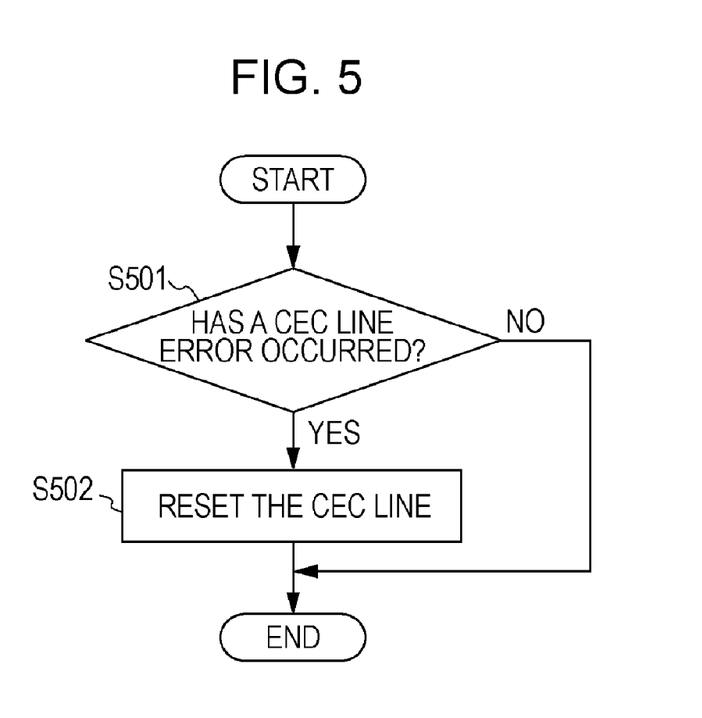
FIG. 5 is a flowchart illustrating an example of a CEC line reset process executed in the communication apparatus according to the first embodiment of the present invention.

Next, an example of the CEC line reset process executed in steps S309 in FIG. 3 will be described with reference to FIG. 5. Note that the process illustrated in the flowchart in FIG. 5 is controlled by the CPU 101 executing the computer program stored in the ROM 116.

In step S501, the CPU 101 determines whether the communication error relating to the CEC line 302 has occurred. Occurrence of the communication error relating to the CEC line 302 is detected by the error detecting unit 108. For example, in a case where the number of retries of a CEC command exceeds a predetermined number of times, the error detecting unit 108 detects the occurrence of the communication error relating to the CEC line 302. Also, in the case of detecting a transmission error of the CEC command received from the television 200, the error detecting unit 108 also detects the occurrence of the communication error relating to the CEC line 302. The detection result of the error detecting unit 108 is informed to the CPU 101, whereby the CPU 101 can determine whether the communication error relating to the CEC line 302 has occurred.

If the communication error relating to the CEC line 302 has occurred (YES in S501), the process proceeds to step S502 from step S501. If the communication error relating to the CEC line 302 has not occurred (NO in S501), the process ends, and consequently, the processing returns to step S310 in FIG. 3.

In step S502, the CPU 101 supplies a CEC reset signal to the CEC driver 107b. The CEC driver 107b which has received the CEC reset signal from the CPU 101 resets the CEC line 302 to return the CEC line 302 to a normal state. At this time, the CEC line 302 is reset by the CEC driver 107b, but the TMDS line 301 is not reset by the TMDS driver 107a. Accordingly, while the CEC line 302 is reset, the TMDS line 301 maintains an enabled state. Thus, the video camera 100 can return the CEC line 302 to a normal state from a communication error relating to the CEC line 302 state without interrupting transmission or reception of video data, audio data, and auxiliary data.

Thus, with the video camera 100 according to the first embodiment, the TMDS line 301 and CEC line 302 can be reset separately, and accordingly, the entire communication unit 105 has not to be reset. Thus, the predetermined period of time until the CEC line 302 returns to a normal state from the communication error relating to the CEC line 302 state can be reduced.

Also, with the video camera 100 according to the first embodiment, in a case where the communication error relating to the TMDS line 301 has been detected, of the TMDS line 301 and CEC line 302, only the TMDS line 301 can be reset. Thus, the TMDS line 301 can be returned to a normal state from a communication state without interrupting transmission or reception of a CEC command. Also, with the video camera 100 according to the first embodiment, in a case where the communication error relating to the CEC line 302 has been detected, of the TMDS line 301 and CEC line 302, only the CEC line 302 can be reset. Thus, the CEC line 302 can be returned to a normal state from a communication state without interrupting transmission or reception of video data, audio data, and auxiliary data.

Second Embodiment

Next, the second embodiment of the present invention will be described with reference to FIGS. 1 through 4 and FIG. 6. The second embodiment is an embodiment wherein the CEC line reset process according to the first embodiment has been changed to another CEC line reset process. Accordingly, with the second embodiment, with regard to components common to the first embodiment, description thereof will be omitted, and components different from the first embodiment will be described.

Figure 6:
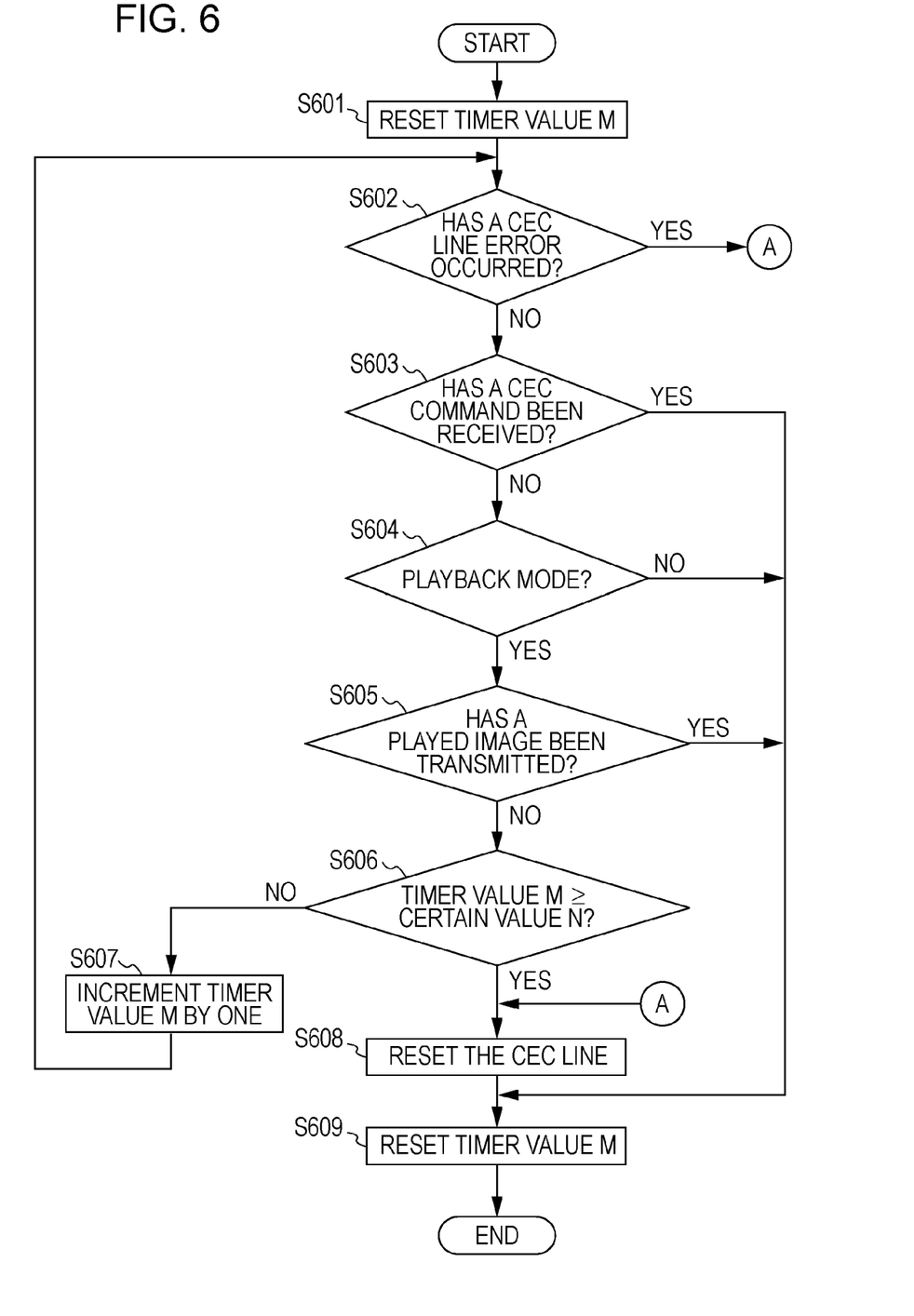
FIG. 6 is a flowchart illustrating an example of a CEC line reset process executed in the communication apparatus according to the second embodiment of the present invention.

FIG. 6 is a flowchart illustrating an example of the CEC line reset process executed in step S309 in FIG. 3. Note that the process illustrated in the flowchart in FIG. 6 is controlled by the CPU 101 executing the computer program stored in the ROM 116.

In step S601, the CPU 101 resets the value M of the timer 102 to zero.

In step S602, the CPU 101 determines whether the communication error relating to the CEC line 302 has occurred. The occurrence of the communication error relating to the CEC line 302 is detected by the error detecting unit 108. For example, in a case where the number of retries of a CEC command exceeds a predetermined number of times, the error detecting unit 108 detects the occurrence of the communication error relating to the CEC line 302. The detection result of the error detecting unit 108 is informed to the CPU 101, whereby the CPU 101 can determine whether the communication error relating to the CEC line 302 has occurred.

If the communication error relating to the CEC line 302 has occurred (YES in S602), the process proceeds to step S608 from step S602. If the communication error relating to the CEC line 302 has not occurred (NO in S602), the process proceeds to step S603 from step S602.

In step S603, the CPU 101 determines whether a CEC command has been received from the television 200. In the case of receiving the CEC command from the television 200, the received CEC command is supplied to the CPU 101 via the communication unit 105 and command processing unit 111. Thus, the CPU 101 can determine whether a CEC command has been received from the television 200.

If a CEC command has been received from the television 200 (YES in S603), the CPU 101 determines that the CEC line 302 is in a normal state. In this case, the process proceeds to step S609 from step S603. If a CEC command has not been received from the television 200 (NO in S603), the process proceeds to step S604 from step S603.

In step S604, the CPU 101 determines whether the operation mode of the video camera 100 is the playback mode.

If the operation mode of the video camera 100 is the playback mode (YES in S604), the process proceeds to step S605 from step S604.

If the operation mode of the video camera 100 is not the playback mode but the image capture mode (NO in S604), the process proceeds to step S609 from step S604. In a case where the operation mode of the video camera 100 is the image capture mode, it is expected that there is a high possibility that the user is viewing the video data that the video camera 100 is transmitting to the television 200, and the frequency wherein a CEC command is transmitted from the television 200 to the video camera 100 is low. In this case, unless the timer 102 is reset, in spite of the CEC line 302 being in a normal state, there is a possibility that the CEC line 302 is frequently reset. Accordingly, in this case, the process proceeds to step S609 from step S604.

In step S605, the CPU 101 determines whether the video camera 100 is in a state in which the video data recorded in the recording medium, and the audio data thereof are transmitted to the television 200 via the TMDS line 301.

If the video camera 100 is in a state in which the video data recorded in the recording medium, and the audio data thereof are transmitted to the television 200 via the TMDS line 301 (YES in S605), the process proceeds to step S609 from step S605. This is because in this case, it is expected that there is a high possibility that the user is viewing the video data that the video camera 100 is transmitting to the television 200, and the frequency wherein a CEC command is transmitted from the television 200 to the video camera 100 is low. In this case, unless the timer 102 is reset, in spite of the CEC line 302 being in a normal state, there is a possibility that the CEC line 302 is frequently reset. Accordingly, in this case, the process proceeds to step S609 from step S605.

If the video camera 100 is not in a state in which the video data recorded in the recording medium, and the audio data thereof are transmitted to the television 200 via the TMDS line 301 (NO in S605), the process proceeds to step S606 from step S605. This is because in this case, it is expected that there is a high possibility that the user is operating the menu screen of the video camera 100 displayed on the television 200 by using the remote control unit 209, and the frequency wherein a CEC command is transmitted from the television 200 to the video camera 100 is high.

In step S606, the CPU 101 compares the value M of the timer 102 and a constant value N stored in the ROM 116 to determine whether the value M of the timer 102 has reached the constant value N. Hereafter, a predetermined period of time until the value M of the timer 102 has reached the constant value N will be referred to as "predetermined period of time T".

If the value M of the timer 102 has reached the constant value N, the CPU 101 determines that some sort of communication error relating to the CEC line 302 has occurred. In a case where a CEC command cannot be received from the television 200 until the predetermined period of time elapses, there is a high possibility that some sort of communication error relating to the CEC line 302 has occurred. In this case (YES in S606), the process proceeds to step S608 from step S606. If the value M of the timer 102 has not reached the constant value N (NO in S606), the process proceeds to step S607 from step S606.

In step S607, the CPU 101 increments the value M of the timer 102 by one. Subsequently, the process returns to step S602 from step S607.

In step S608, the CPU 101 supplies a CEC reset signal to the CEC driver 107b. The CEC driver 107b which has received the CEC reset signal from the CPU 101 resets the CEC line 302 to return the CEC line 302 to a normal state. At this time, the CEC line 302 is reset by the CEC driver 107b, but the TMDS line 301 is not reset by the TMDS driver 107a. Accordingly, while the CEC line 302 is reset, the TMDS line 301 maintains an enabled state. Thus, the video camera 100 can return the CEC line 302 to a normal state from the communication error relating to the CEC line 302 state without interrupting transmission or reception of video data, audio data, and auxiliary data.

In step S609, the CPU 101 resets the value M of the timer 102 to zero. Subsequently, the process ends, and consequently, the process returns to step S310 in FIG. 3.

Thus, with the video camera 100 according to the second embodiment, the TMDS line 301 and CEC line 302 can be reset separately, and accordingly, the entire communication unit 105 has not to be reset. Thus, the predetermined period of time until the CEC line 302 returns to a normal state from the communication error relating to the CEC line 302 state can be reduced.

Also, with the video camera 100 according to the second embodiment, in a case where the communication error relating to the TMDS line 301 state has been detected, of the TMDS line 301 and CEC line 302, only the TMDS line 301 can be reset. Thus, the TMDS line 301 can be returned to a normal state from a communication state without interrupting transmission or reception of a CEC command.

Also, with the video camera 100 according to the second embodiment, in a case where the communication error relating to the CEC line 302 has been detected, of the TMDS line 301 and CEC line 302, only the CEC line 302 can be reset. Thus, the CEC line 302 can be returned to a normal state from a communication state without interrupting transmission or reception of video data, audio data, and auxiliary data.

Also, in a case where a CEC command cannot be received from the television 200 until the predetermined period of time elapses, of the TMDS line 301 and CEC line 302, only the CEC line 302 can be reset. Thus, the video camera 100 can return the CEC line 302 to a normal state from the communication error relating to the CEC line 302 state without interrupting transmission or reception of video data, audio data, and auxiliary data.

Also, with the video camera 100 according to the second embodiment, in a case where determination is made that the operation mode of the video camera 100 is not the playback mode but the image capture mode, the timer 102 can be reset. Thus, the problem can be avoided wherein the CEC line 302 is frequently set in spite of the CEC line 302 being in a normal state. Also, with the video camera 100 according to the second embodiment, in a case where the video camera 100 is in a state of transmitting the video data recorded in the recording medium, and the audio data thereof to the television 200 via the TMDS line 301, the timer 102 can be reset. Thus, the problem can be avoided wherein the CEC line 302 is frequently set in spite of the CEC line 302 being in a normal state.

Note that, with the second embodiment, an arrangement has been made wherein the process in steps S604 and S605 in FIG. 6 is executed between the process in step S603 and the process in step S606, but the present invention is not restricted to such an arrangement. For example, the process in steps S604 and S605 may be executed between the process in step S606 and the processing in step S607.

Other Embodiments

The communication apparatus according to the present invention is not restricted to the communication apparatuses described in the first and second embodiments. For example, the communication apparatus according to the present invention may be realized with a system configured of multiple apparatuses.

Also, the various types of processes and functions described in the first and second embodiments may be realized with a computer program. In this case, the computer program according to the present invention is executed in a computer (including a CPU (Central Processing Unit) and so forth), thereby realizing the various types of functions described in the first and second embodiments.

It goes without saying that the various types of processing and functions described in the first and second embodiments may be realized with the computer program according to the present invention by using the OS (Operating System) or the like running on the computer.

The computer program according to the present invention is read out from a computer readable recording medium, and is executed in the computer. As the computer readable recording medium, a hard disk apparatus, optical disc, CD-ROM, CD-R, memory card, ROM, or the like may be employed. Also, an arrangement may be made wherein the computer program according to the present invention is provided to the computer from an external apparatus via a communication interface, and is executed in the computer thereof.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-187296 filed Jul. 18, 2008, which is hereby incorporated by reference herein in its entirety.

What is claimed is:

1. A communication apparatus, comprising:
a transmitting unit that transmits video data to an external apparatus via a first transmission line;
a receiving unit that receives a command from the external apparatus via a second transmission line;
a detection unit that detects a first communication error relating to the first transmission line and a second communication error relating to the second transmission line; and
a control unit that resets the transmitting unit without resetting the receiving unit if the first communication error is detected and the second communication error is not detected,
wherein the control unit resets the receiving unit without resetting the transmitting unit if the second communication error is detected and the first communication error is not detected,
wherein the second transmission line is used for communicating with the external apparatus according to CEC (Consumer Electronics Control) protocol, and
the detection unit does not detect the second communication error if a logical address is not acquired via the second transmission line.

2. The communication apparatus according to claim 1, wherein the control unit resets the receiving unit without resetting the transmitting unit, if the first communication error and the second communication error are not detected and the command is not received by the receiving unit via the second transmission line until a predetermined period of time elapses.

3. The communication apparatus according to claim 2, wherein the control unit does not reset the receiving unit even if the command is not received by the receiving unit via the second transmission line until the predetermined period of time elapses, if the first communication error and the second communication error are not detected and an operation mode of the communication apparatus is a predetermined mode, and
the predetermined mode being used to store video data in a recording medium and transmit the video data stored in the recording medium to the external apparatus via the first transmission line.

4. The communication apparatus according to claim 2, wherein the control unit does not reset the receiving unit even if the command is not received by the receiving unit via the second transmission line until the predetermined period of time elapses, if the first communication error and the second communication error are not detected and video data is being transmitted by the transmitting unit to the external apparatus via the first transmission line.

5. The communication apparatus according to claim 1, wherein the first transmission line is used for transmitting data to the external apparatus according to TMDS (Transition Minimized Differential Signaling).

6. The communication apparatus according to claim 1, wherein the control unit controls the receiving unit to stop to receive the command if the logical address is not acquired via the second transmission line.

7. A method of controlling a communication apparatus, the communication apparatus including (a) a transmitting unit that transmits video data to an external apparatus via a first transmission line and (b) a receiving unit that receives a command from the external apparatus via a second transmission line, the method comprising:
detecting a first communication error relating to the first transmission line;
detecting a second communication error relating to the second transmission line;
not detecting the second communication error if a logical address is not acquired via the second transmission line;
resetting the transmitting unit without resetting the receiving unit if the first communication error is detected and the second communication error is not detected; and
resetting the receiving unit without resetting the transmitting unit if the second communication error is detected and the first communication error is not detected,
wherein the second transmission line is used for communicating with the external apparatus according to CEC (Consumer Electronics Control) protocol.

8. The method according to claim 7, further comprising:
resetting the receiving unit without resetting the transmitting unit, if the first communication error and the second communication error are not detected and the command is not received by the receiving unit via the second transmission line until a predetermined period of time elapses.

9. The method according to claim 8, further comprising:
not resetting the receiving unit even if the command is not received by the receiving unit via the second transmission line until the predetermined period of time elapses, if the first communication error and the second communication error are not detected and an operation mode of the communication apparatus is a predetermined mode, and
wherein the predetermined mode being used to store video data in a recording medium and transmit the video data stored in the recording medium to the external apparatus via the first transmission line.

10. The method according to claim 8, further comprising:
not resetting the receiving unit even if the command is not received by the receiving unit via the second transmission line until the predetermined period of time elapses, if the first communication error and the second communication error are not detected and the video data is being transmitted by the transmitting unit to the external apparatus via the first transmission line.

11. The method according to claim 7,
wherein the first transmission line is used for transmitting data to the external apparatus according to TMDS (Transition Minimized Differential Signaling).

12. The method according to claim 7, further comprising:
controlling the receiving unit to stop to receive the command if the logical address is not acquired via the second transmission line.

13. A computer-readable recording medium storing a program executed by a computer, wherein the program for using the computer to perform a method of controlling a communication apparatus including (a) a transmitting unit that transmits video data to an external apparatus via a first transmission line, and (b) a receiving unit that receives a command from the external apparatus via a second transmission line, the method comprising:
detecting a first communication error relating to the first transmission line;
detecting a second communication error relating to the second transmission line;
not detecting the second communication error if a logical address is not acquired via the second transmission line;
resetting the transmitting unit without resetting the receiving unit if the first communication error is detected and the second communication error is not detected; and
resetting the receiving unit without resetting the transmitting unit if the second communication error is detected and the first communication error is not detected,
wherein the second transmission line is used for communicating with the external apparatus according to CEC (Consumer Electronics Control) protocol.

14. The computer-readable recording medium according to claim 13, further comprising:
resetting the receiving unit without resetting the transmitting unit, if the first communication error and the second communication error are not detected and the command is not received by the receiving unit via the second transmission line until a predetermined period of time elapses.

15. The computer-readable recording medium according to claim 14, further comprising:
not resetting the receiving unit even if the command is not received by the receiving unit via the second transmission line until the predetermined period of time elapses, if the first communication error and the second communication error are not detected and an operation mode of the communication apparatus is a predetermined mode, and
wherein the predetermined mode being used to store video data in a recording medium and transmit the video data stored in the recording medium to the external apparatus via the first transmission line.

16. The computer-readable recording medium according to claim 14, further comprising:
not resetting the receiving unit even if the command is not received by the receiving unit via the second transmission line until the predetermined period of time elapses, if the first communication error and the second communication error are not detected and the video data is being transmitted by the transmitting unit to the external apparatus via the first transmission line.

17. The computer-readable recording medium according to claim 13,
wherein the first transmission line is used for transmitting data to the external apparatus according to TMDS (Transition Minimized Differential Signaling).

18. The computer-readable recording medium according to claim 13, further comprising:
controlling the receiving unit to stop to receive the command if the logical address is not acquired via the second transmission line.

* * * * *